United States Patent [19]
Mussmann et al.

[11] Patent Number: 6,040,263
[45] Date of Patent: Mar. 21, 2000

[54] CATALYTIC COMPOSITION BASED ON TRANSITION METAL COMPLEXES, AND A PROCESS FOR THE HYDROGENATION OF UNSATURATED COMPOUNDS

[75] Inventors: Lothar Mussmann, Hanau-Wolgang, Germany; Yves Chauvin, Le Peco; Helene Olivier, Rueil Malmaison, both of France

[73] Assignee: Institut Francais du Petrole, France

[21] Appl. No.: 09/154,402

[22] Filed: Sep. 15, 1998

Related U.S. Application Data

[62] Division of application No. 08/664,539, Jun. 17, 1996, Pat. No. 5,852,130.

[30] Foreign Application Priority Data

Jun. 16, 1995 [FR] France ................................. 95 07328

[51] Int. Cl.⁷ .............................. B01J 31/00; C07C 5/10; C07C 5/05; C07C 5/02; C07C 5/03
[52] U.S. Cl. ..................... 502/164; 502/169; 502/153; 502/165; 502/166; 585/269; 585/270; 585/273; 585/275; 585/277
[58] Field of Search ..................... 502/153, 164, 502/165, 166; 585/269, 270, 273, 275, 277

[56] References Cited

U.S. PATENT DOCUMENTS

| | | | |
|---|---|---|---|
| 2,738,364 | 3/1956 | Reppe et al. | 502/164 |
| 4,169,853 | 10/1979 | Knifton | 260/575 |
| 4,927,960 | 5/1990 | Maeda et al. | 568/9 |
| 4,992,609 | 2/1991 | Maeda et al. | 585/509 |
| 5,100,854 | 3/1992 | Maeda et al. | 502/164 |
| 5,104,840 | 4/1992 | Chauvin et al. | 502/117 |
| 5,367,107 | 11/1994 | Bahrmann et al. | 568/454 |
| 5,442,107 | 8/1995 | Beevor et al. | 562/519 |
| 5,852,130 | 12/1998 | Mussmann et al. | 585/266 |

FOREIGN PATENT DOCUMENTS

| | | |
|---|---|---|
| 2053828 | 5/1992 | Canada . |
| 0 296 550 | 12/1988 | European Pat. Off. . |
| 0 391 680 | 10/1990 | European Pat. Off. . |
| 0483536 | 5/1992 | European Pat. Off. . |
| 0 553 009 | 7/1993 | European Pat. Off. . |
| 0 602 463 | 6/1994 | European Pat. Off. . |
| 0 672 649 | 9/1995 | European Pat. Off. . |
| 2611700 | 9/1988 | France . |
| 2313017 | 9/1973 | Germany . |

*Primary Examiner*—Mark L. Bell
*Assistant Examiner*—J. Pasterczyk
*Attorney, Agent, or Firm*—Millen, White, Zelano & Branigan, P.C.

[57] ABSTRACT

A novel non-aqueous catalytic composition comprises at least one quaternary ammonium and/or phosphonium salt in which the anion is selected from the group consisting of tetrafluoroborate, tetrachloroborate, hexafluorophosphate, hexafluoroantimonate, hexafluoroarsenate, trifluorosulphonate, fluorosulphonate, trifluoromethylsulphonate, trifluoroarsenate, dichlorocuprate, trichlorocuprate, tetrachlorocuprate, and trichlorozincate, and at least one complex of a transition metal from groups 8, 9 or 10, i.e., iron, ruthenium, colbalt, rhodium iridium, nickel, palladium and platinum. The catalyst can be used in a process of total or selective hydrogenation of unsaturated compounds such as monoolefins, diolefins, acetylene compounds, aromatic compounds, or polynuclear aromatic compounds. Hydrogenation may be accompanied by isomerisation.

23 Claims, No Drawings

CATALYTIC COMPOSITION BASED ON TRANSITION METAL COMPLEXES, AND A PROCESS FOR THE HYDROGENATION OF UNSATURATED COMPOUNDS

This is a division of application Ser. No. 08/664,539 filed Jun. 17, 1996, now U.S. Pat. No. 5,852,130.

FIELD OF THE INVENTION

An object of the present invention is to provide a novel catalytic composition, the composition resulting from the interaction of an organic-inorganic salt which is liquid at the reaction temperature, hereinbelow termed a "molten salt", and a complex of a transition metal from groups 8, 9 or 10.

BACKGROUND OF THE INVENTION

A very large number of transition metal complexes are known which catalyse the hydrogenation of unsaturated compounds and which are soluble in suitable organic solvents or in the reactants and in the hydrogenation products. Those catalysts are dealt with in an article in "Principles and Applications of Organotransition Metal Chemistry", by J. P. Collman, University Science Books, Mill Valley, U.S.A.

United States patent U.S. Pat. No. 3,565,823 describes a composition consisting of a dispersion constituted by a compound, in particular of a transition metal in a salt of tin or germanium and a quaternary ammonium or phosphonium. U.S. Pat. No. 3,657,368 describes an olefin hydrogenation process and U.S. Pat. No. 3,919,271 describes a nitrile hydrogenation process, both using the above composition. U.S. Pat. No. 3,832,391 claims an olefin carbonylation process using the same composition.

The compositions described above have the disadvantage of having a relatively high melting point, the hydrogenation reaction thus taking place at 50° C., for example.

SUMMARY OF THE INVENTION

We have now discovered that complexes of transition metals from groups 8, 9 or 10, in particular ruthenium, rhodium and iridium complexes, combined with an organic-inorganic salt which is liquid at low temperatures, can be used to hydrogenate unsaturated compounds.

One object of the invention is to provide a catalytic composition comprising at least one compound of a transition metal from groups 8, 9 or 10, in particular complexes of ruthenium, rhodium and iridium, and at least one quaternary ammonium and/or phosphonium salt, said composition resulting from at least partial dissolution of a transition metal compound in a "molten salt".

A further object of the invention is to provide a process for the hydrogenation of double or triple bonds between carbon atoms in unsaturated compounds, in which the unsaturated compound or compounds is/are brought into contact with a complex of a transition metal from groups 8 and 9, in particular ruthenium, rhodium and iridium, the compound being at least partially dissolved in a "molten salt". The "molten salt" medium is constituted by an organic cation and an inorganic anion. The hydrogenation products are slightly soluble or insoluble in the catalytic composition.

The "molten salts" of the invention are non aqueous, ionic in nature and have the general formula QA where Q represents a quaternary ammonium and/or quaternary phosphonium cation and A represents any known anion which can form a liquid salt at low temperatures, i.e., below 150° C., advantageously at most 80° C., preferably below 50° C., such as the following ions: tetrafluoroborate, tetrachloroborate, hexafluorophosphate, hexafluoroantimonate, hexafluoroarsenate, trifluoromethylsulphonate, fluorosulphonate, tetrachloroaluminate, dichlorocuprate, and trichlorozincate. Anions selected from the group formed by trichlorocuprate, tetrachlorocuprate, heptachloroaluminate and decachloroaluminate can also be used. One particular catalytic composition (Ni) contains no aluminate ions. Halide and hydroxide ions are excluded from the invention. The quaternary ammonium and/or phosphonium ions preferably have the general formulae $NR^1R^2R^3R^{4+}$ and $P\ R^1R^2R^3R^{4+}$, or have general formulae $R^1R^2N=CR^3R^{4+}$ and $R^1R^2P=CR^3R^{4+}$, where $R^1$, $R^2$, $R^3$ and $R^4$, which may be identical or different, represent hydrogen with the exception of the cation $NH_{4+}$, and preferably a single substituent can represent hydrogen, or hydrocarbon residues containing 1 to 12 carbon atoms, for example saturated or unsaturated, cycloalkyl or aromatic, aryl or aralkyl alkyl groups containing 1 to 12 carbon atoms. The ammonium and/or phosphonium ions can also be derived from nitrogen-containing or phosphorous-containing heterocycles containing 1, 2 or 3 nitrogen and/or phosphorous atoms, with the following general formulae:

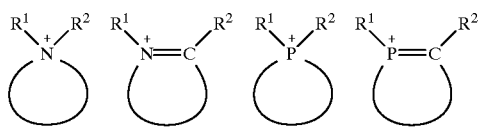

where the cycles are constituted by 4 to 10 atoms, preferably 5 to 6 atoms, $R^1$ and $R^3$ being as defined above. The quaternary ammonium or phosphonium cation can also be a cation with formula

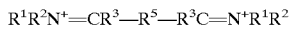

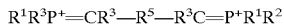

where $R^1$, $R^2$ and $R^3$, which may be identical or different, are as defined above and $R^5$ represents an alkylene or phenylene residue. Examples of $R^1$, $R^2$, $R^3$ and $R^4$ groups are methyl, ethyl, propyl, isopropyl, butyl, secondary butyl, tertiary butyl, amyl, methylene, ethylidene, phenyl or benzyl radicals; $R^5$ may be a methylene, ethylene, propylene or phenylene group. The ammonium and/or phosphonium cation is preferably selected from the group formed by N-butylpyridinium, N-ethylpyridinium, 3-butyl-1-methylimidazolium, diethylpyrazolium, 3-ethyl-1-methylimidazolium, pyridinium, trimethylphenylammonium, 3-ethyl-1-methylimidazolium, and tetrabutylphosphonium. Examples of suitable salts are N-butylpyridinium hexafluorophosphate, N-ethylpyridinium tetrafluoroborate, tetrabutylphosphonium tetrafluoroborate, 3-butyl-1-methylimidazolium hexafluoroantimonate, 3-butyl-1-methylimidazolium hexafluorophosphate, 3-butyl-1-methylimidazolium trifluoromethylsulphonate, pyridinium fluorosulphonate, trimethylphenylammonium hexafluorophosphate, 3-butyl-1-methylimidazolium tetrachloroaluminate, 3-butyl-1-methylimidazolium heptachloroaluminate, trimethylphenylammonium chloride, 3-ethyl-1-methylimidazolium chloride, tetrabutylphosphonium bromide, N-butylpyridinium chloride, N-ethylpyridinium bromide, 3-butyl-1-methylimidazolium chloride, diethylpyrazolium chloride, and pyridinium hydrochloride. These salts can be used alone or as a mixture. They act as a solvent.

As a result, the solvent of the catalytic composition contains mainly this/these salt/salts. If other solvents are present, their essential function is to allow dissolution of the transition metal compound before mixing it with the salt.

The transition metal compounds for use in accordance with the invention are in general all those transition metal complexes which are known to the skilled person. These are zero-, mono-, di- or trivalent compounds in which the metal is selected from the group formed by Fe, Ru, Os, Co, Rh, Ir, Ni, Pd, Pt, advantageously from the group formed by Ru, Rh, Ir, Co, Pt, Pd, and preferably Ru, Rh, Ir, and can for example be bonded to halide, hexafluorophosphate, hexafluoroarsenate, tetrafluoroborate, tetrachloroborate, etc. ions, hydride ions, and hydrocarbon ligands such as cyclopentadienyls and substituted cyclopentadienyls, acetylacetonates and substituted acetylacetonates, or neutral ligands such as tertiary phosphines, ditertiary diphosphines, phosphites, olefins, carbon monoxide, or nitriles. These complexes of the invention may be mononuclear or polynuclear, neutral or ionic. They may contain a chiral ligand. Examples of complexes which can be used in the present invention are $RuH_4(PPh_3)_2$, $RhCl(PPh_3)_3$, [Rh(norbornadiene) $(PPh_3)_2]^+[PF_6]^-$, $IrCl(PPh_3)_3$, $HRh(CO)(PPh_3)_3$, $(C_5H_5)RhCl_2$, $Rh(C_5Me_5)Cl_2(Ph_2PCH_2COPh)$, $IrCl(CO)(PPh_3)_2$, $[Rh(norbornadiene)(PPh_3)(Ph_2PCH_2COPh)]^+[PF_6]^-$, [Rh(norbornadiene)(bisdiphenylphosphinoethane)]$^+[PF_6]^-$, [Rh(norbornadiene)(bisdiphenylarsinoethane)]$^+[PF_6]^-$, [Rh(norbornadiene)(DIOP)]$^+[PF_6]^-$, $[Ru(norbornadiene)(C_5Me_5)]^+[BF_4]^-$, $[(C_6Me_6)RuCl_2]_2$, $[(C_6H_6)RuCl_3Ru(C_6H_6)]PF_6^-$, and $[RhCl(cyclooctene)_2]$.

These complexes can be prepared remote from the reaction medium and introduced into it for reaction. They can also be formed in situ in the reaction medium, by introducing the components necessary for their formation. Other transition metal compounds can be used, such as inorganic salts, oxides, hydroxides, or organic salts.

In general, the catalytic composition can contain an organic solvent such as aromatic hydrocarbon or a hydrocarbon-containing compound, but the quantity of organic solvent is lower than that of the molten salt. The catalytic composition does not contain water.

The concentration of the compound containing the transition metal complex in the molten salt is advantageously in the range 1 mmole of complex per liter of molten salt to 500 mmoles per liter, preferably in the range 2 mmoles per liter to 200 mmoles per liter, more preferably in the range 2 mmoles per liter to 100 mmoles per liter, most preferably in the range 2 mmoles per liter to 50 mmoles per liter.

The compounds in the composition of the invention can be mixed in any order at a temperature of more than −20° C., generally in the range −20° C. to at most 150° C., preferably in the range −20° C. to 140° C., advantageously in the range 0°C. to 120° C., most preferably 0–80° C. or 0–50° C.

A further object of the invention is to provide a catalyst comprising on a support impregnated with the catalytic composition described above.

The support generally has a specific surface area of 0.01 to 1500 m$^2$/g, preferably 0.01 to 150 m$^2$/g, or more preferably 0.01 to 50 m$^2$/g. Its total pore volume is generally 0.005 to 1.5 cm$^3$/g, preferably 0.005 to 1 cm$^3$/g, more preferably 0.005 to 0.8 cm$^3$/g.

The support is selected from organic or inorganic supports, such as macroreticular resins, perfluorinated resins, charcoal, the oxides $SiO_2$, $ZrO_2$, $TiO_2$, $SnO_2$, $Al_2O_3$, $Fe_2O_3$, or $HfO_2$, or any combination of these oxides.

A process for preparing the catalyst comprises at least one calcining step for the support at a preferred temperature of 200–600° C., followed by impregnation with the catalytic solution using any known method known to the skilled person.

A still further object of the invention is to provide a process for the hydrogenation of an unsaturated compound using a catalytic composition or a catalyst as defined above.

Unsaturated compounds which can be hydrogenated in accordance with the invention are simple olefins, diolefins (in particular conjugated diolefins), acetylenic compounds, and aromatic hydrocarbons (in particular polynuclear aromatic hydrocarbons). They may contain one or more heteroatoms, in particular unsaturated heteroatoms, such as a ketone function or a carboxylic function. Examples are the hydrogenation of butene to butane, pentene to pentane 1,3-butadiene to butene, vinylacetylene to butadiene, isoprene to 2-methylbutene, 1,5-cyclooctadiene to cyclooctene, 1,5,9-cyclododecatriene to cyclododecene, and anthracene to tetrahydroanthracene. Hydrogenation can be total or selective, for example diolefins to monoolefins. Hydrogenation may be accompanied by isomerisation, for example 1-butene to 2-butene, or 1-pentene to 2-pentene.

In the hydrogenation process, the unsaturated compound may be used pure or diluted by saturated or unsaturated hydrocarbons such as those found in cuts from various hydrocarbon refining processes. An example is butanes and/or butenes with butadiene.

The hydrogenation temperature is in the range −10° C. to 200° C., advantageously less than 150° C., preferably in the range +10° C. to less than 150° C. The total pressure or partial pressure of hydrogen is between atmospheric pressure or a pressure below atmospheric pressure and 20 MPa, preferably between atmospheric pressure and 10 MPa.

Catalytic hydrogenation of unsaturated compounds can be carried out in a closed system, a batch system or in a continuous system using one or more reaction stages. At the reactor outlet, the organic phase containing the reaction products is advantageously separated by simple settling out of the polar catalytic phase containing the molten salt and the major portion of the catalyst. The polar phase which contains at least a portion of the catalyst is, at least partially returned to the reactor, the other portion being treated to eliminate the remaining catalyst.

Examples of unsaturated compounds to which the process can advantageously be applied are butenes, pentenes, butadiene, isoprene, piperylene, and 1,5-cyclooctadiene.

The following examples illustrate the invention without in any way limiting its scope.

EXAMPLE 1

4 ml of butylmethylimidazolium hexafluorophosphate, 43.2 mg (0.05 mmole) of $[Rh(norbornadiene)(PPh_3)_2]^+PF_6^-$ complex dissolved in 2 ml of acetone, and 2 ml of 1-pentene were introduced into a 50 ml capacity double-walled glass reactor which had been purged of air and moisture and placed under one atmosphere of hydrogen. Two liquid phases were observed, the lower clear phase being brown in colour and the hydrocarbon phase, colourless. The hydrogen pressure was taken to 0.1 MPa and the temperature taken to 30° C., and stirring was started. After 2 hours, stirring was stopped and the mixture was allowed to settle; the supernatant hydrocarbon phase was extracted. More than 99% of the 1-pentene had been converted, with 35% of the products being pentane and 65% of the products being 2-pentenes. A new charge of 1-pentene was introduced; after 2 hours of reaction, more than 99% of the 1-pentene had been converted. The reaction was repeated 3 more times using the same salt containing the same rhodium complex with the same results with no apparent loss of rhodium.

EXAMPLE 2

The salt of the above example containing the rhodium complex was taken and the volatile organic compounds were eliminated by placing it under vacuum. 2 ml of 1-pentene was introduced in a hydrogen atmosphere and the reaction was carried out under the conditions given in the above example. The same results were obtained and the test was repeated three more times.

EXAMPLE 3

The method of Example 1 was followed, with the exception that no acetone was introduced. The polar phase was brown in colour and the hydrocarbon phase was colourless. 95% conversion was obtained and 56% of the products was pentane. The test was repeated three more times with the same results.

EXAMPLE 4

The salt of the previous example containing the rhodium complex was taken, from which the volatile organic compounds had been eliminated by placing it under vacuum. 5 ml of heptane and 2 ml of 1-pentene were introduced in a hydrogen atmosphere under the conditions of that Example. The organic phase was colourless. More than 99% conversion was obtained and 62% of the products was pentane.

EXAMPLE 5

The salt of the previous example containing the rhodium complex was taken, from which the volatile organic compounds had been eliminated by placing it under vacuum. 18.4 mmoles of 1,3-cyclohexadiene was introduced in a hydrogen atmosphere under the conditions of Example 1. 92.3% conversion of the cyclohexadiene was obtained and 90% of the products was cyclohexene.

EXAMPLE 6

The method of Example 3 was followed, with the exception that the 4 ml of butylmethylimidazolium hexafluorophosphate was replaced by 4 ml of butylmethylimidazolium hexafluoroantimonate. The polar phase was red-brown in colour and the organic phase was colourless. 96% conversion was obtained, pentane representing 83% of the products and 2-pentenes, 17%. The test was repeated three more times with the same molten salt and the same rhodium complex, with the same results.

EXAMPLE 7

The method of Example 1 was followed, with the exception that the $[Rh(norbornadiene)(PPh_3)_2]^+PF_6^-$ complex was replaced by 0.05 mmole of $[(norbornadiene)Rh(Ph_2PCH_2COPh)(PPh_3)]^+[PF_6^-]$ complex. The lower phase was orangey in colour and the hydrocarbon phase was colourless. After 2 hours stirring, the medium was allowed to settle and the hydrocarbon phase was extracted. 98% of the 1-pentene had been converted. The operation was repeated after eliminating the volatile organic compounds by placing under vacuum, then a further time by introducing 5 ml of heptane. The results were identical to that of the initial test.

EXAMPLE 8

4 ml of butylmethylimidazolium hexafluoroantimonate, 0.05 mmole of $[(norbornadiene)Rh(Ph_2PCH_2COPh)(PPh_3)_2]^+[PF_6^-]$ complex and 2 ml of 1-pentene were introduced into a 50 ml capacity double-walled glass reactor which had been purged of air and moisture and placed under one atmosphere of hydrogen. Two liquid phases were observed, the lower clear phase being brown in colour and the hydrocarbon phase, colourless. The hydrogen pressure was taken to 0.1 MPa and the temperature taken to 30° C., and stirring was started. After 2 hours, stirring was stopped and the mixture was allowed to settle; the supernatant hydrocarbon phase was extracted. 81% of the 1-pentene had been converted, with 27% of the products being pentane and 73% of the products being 2-pentenes. The reaction was repeated two more times using the same salt containing the same rhodium complex with the same results with no apparent loss of rhodium.

EXAMPLE 9

4 ml of the salt used in Example 5 containing the rhodium complex and from which the volatile organic compounds had been eliminated by placing under vacuum was introduced into a 50 ml capacity double-walled glass reactor which had been purged of air and moisture and placed under one atmosphere of hydrogen. 81.5 mg of anthracene dissolved in 5 ml of benzene was introduced in a hydrogen atmosphere. Two liquid phases were observed, the lower clear phase being orange-brown in colour and the hydrocarbon phase, colourless. The hydrogen pressure was taken to 0.5 MPa and the temperature taken to 60° C. and stirring was started. After 15 minutes stirring was stopped and the mixture was allowed to settle, the supernatant hydrocarbon phase was extracted. 74% of the anthracene had been converted, 70% being constituted by tetrahydroanthracene and the remainder by dihydroanthracene.

EXAMPLE 10

4 ml of butylmethylimidazolium hexafluoroantimonate and 0.05 mmole of $[Rh(norbornadiene)(PPh_3)_2]^+PF_6^-$ complex, which mixture had been used to hydrogenate 1-pentene and from which the volatile organic compounds had been eliminated by placing under vacuum, were introduced into a 50 ml capacity double-walled glass reactor which had been purged of air and moisture and placed under one atmosphere of hydrogen. 81.5 ma of anthracene dissolved in 5 ml of benzene was introduced in a hydrogen atmosphere. Two liquid phases were observed, the lower clear phase being orange-brown in colour and the hydrocarbon phase, colourless. The hydrogen pressure was taken to 0.5 MPa and the temperature taken to 60° C., and stirring was started. After 21 hours, stirring was stopped and the mixture was allowed to settle; the supernatant hydrocarbon phase was extracted. 54% of the anthracene had been converted, 88% of which was constituted by tetrahydroanthracene and the remainder by dihydroanthracene.

What is claimed is:

1. A non-aqueous catalytic composition comprising a non-aqueous solvent which is ionic in nature and liquid at a temperature below 150° C. wherein said solvent comprises:

at least one quaternary ammonium and/or phosphonium salt with formula QA, where Q represents a quaternary ammonium and/or phosphonium cation, and A represents a tetrafluoroborate, tetrachloroborate, hexafluorophosphate, trifluoromethylsulphonate, fluorosulphonate, trichlorozincate, trichlorocuprate or tetrachlorocuprate anion; and at least one complex of a transition metal from groups 8, 9 or 10 in a concentration of 1–500 mmoles per liter of said at least one quaternary ammonium and/or phosphonium salt.

2. A catalytic composition according to claim 1, in which the complex of a transition metal is a complex of a transition metal from groups 8 or 9 selected from the group consisting of $RuH_4(PPh_3)_2$, $RhCl(PPh_3)_3$, [Rh(norbornadiene) $(PPh_3)_2]^+[PF_6]^-$; $IrCl(PPh_3)_3$, $HRh(CO)(PPh_3)_3$, $(C_5H_5)RhCl_2$, $IrCl(CO)(PPh_3)_2$, [Rh(norbornadiene) $(PPh_3)$ $(Ph_2PCH_2COPh)]^+[PF_6]^-$; [(Rh(norbornadiene) (bisdiphenylphosphinoethane)]$^+$[PF$_6$]$^-$; [(Rh (norbornadiene) (bisdiphenylarsinoethane)]$^+$[PF$_6$]$^-$, [Ru (norbornadiene)(C$_5$Me$_5$)]$^+$[BF$_4$]$^-$, [(C$_6$Me$_6$)RuCl$_2$]$_2$ and [(C$_6$H$_6$)RuCl$_3$Ru(C$_6$H$_6$)]$^+$[PF$_6$]$^-$.

3. The catalytic composition of claim 1, wherein said transition metal complex has a concentration of 2–50 mmoles per liter of said at least one quaternary ammonium and/or phosphonium salt.

4. A catalytic composition according to claims 1, in which the transition metal is selected from the group consist of nickel, ruthenium, rhodium, iridium, cobalt, platinum and palladium.

5. A catalytic composition according to claim 1, in which the transition metal is nickel and the anion is selected from the group consisting of tetrafluoroborate, tetrachloroborate, hexafluorophosphate, hexafluoroantimonate, hexafluoroarsenate, dichlorocuprate, trifluoromethylsulphonate, fluorosulphonate, trichlorocuprate, tetrachlorocuprate and trichlorozincate.

6. A catalytic composition according to claim 1, in which the quaternary ammonium and/or phosphonium cation is selected from the group consisting of cations with the formulae:

$R^1R^2R^3R^4N^+$  $R^1R^2N=CR^3R^{4+}$  $R^1R^2R^3R^4P^+$,  $R^1R^2P=CR^3R^{4+}$

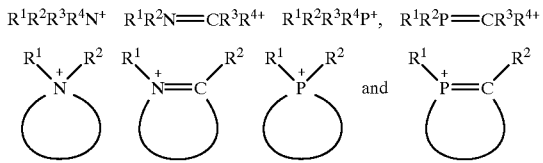

and where $R^1$, $R^2$, $R^3$ and $R^4$, which may be identical or different, represent hydrogen, with the exception of $NH_{4+}$, and hydrocarbon residues containing 1 to 12 carbon atoms, and in which the rings contain 4 to 10 atoms.

7. A catalytic composition according to claim 1, in which the quaternary ammonium and/or phosphonium cation has one of the following general formula:

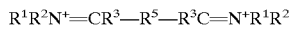
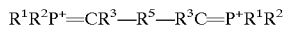

$R^1R^2N^+=CR^3-R^5-R^3C=N^+R^1R^2$ $R^1R^2P^+=CR^3-R^5-R^3C=P^+R^1R^2$ where $R^1$, $R^2$ and $R^3$ which may be identical or different, represent hydrogen or hydrocarbon residues containing 1 to 12 carbon atoms, and $R^5$ represents an alkylene or phenylene residue.

8. A catalytic composition according to claim 1, in which the quaternary ammonium and/or phosphonium cation is selected from the group consisting of N-butylpyridinium, N-ethylpyridinium, 3-butyl-1-methylimidazolium, diethylpyrazolium, 3-ethyl-1-methylimidazolium, pyridinium, trimethylphenylammonium, 3-ethyl-1-methylimidazolium, and tetrabutylphosphonium.

9. The catalytic composition of claim 1, wherein said transition metal complex has a concentration of 2–100 mmoles per liter of said at least one quaternary ammonium and/or phosphonium salt.

10. The catalytic composition of claim 1, wherein said transition metal complex has a concentration of 2–200 mmoles per liter of said at least one quaternary ammonium and/or phosphonium salt.

11. A catalytic composition according to claim 1, in which transition metal in the complex is bonded to ionic or neutral ligands.

12. A catalytic composition according to claim 1 in which the complex of at least one transition metal from groups 8, 9 or 10 is a chloride, bromide or iodide.

13. A catalyst composition according to claim 1, wherein the non-aqueous solvent is molten and the transition metal complex is dissolved therein.

14. A catalytic composition according to claim 1, in which the concentration of the complex of transition metals from groups 8 to 10 is 1 to 500 mmoles per liter with respect to the ammonium and/or phosphonium salt.

15. A catalyst comprising a porous organic or inorganic support impregnated with the catalytic composition according to claim 1.

16. A catalyst according to claim 15, wherein the organic or inorganic support comprises a macroreticular resin, a perfluorinated resin, charcoal or at least one oxide selected from the group consisting of $SiO_2$, $ZrO_2$, $TiO_2$, $SnO_2$, $Al_2O_3$, $Fe_2O_3$ and $HfO_2$.

17. A catalyst according to claim 16, wherein the support is calcinable and is calcined at 200–600° C., and the resultant calcined support is impregnated with a solution of the catalyst composition.

18. A catalytic composition according to claim 4 in which the complex of a transition metal from groups 8, 9 or 10 is a chloride, bromide or iodide.

19. A non-aqueous catalytic composition comprising a non-aqueous solvent which is ionic in nature and liquid in a temperature below 150° C. wherein said non-aqueous solvent comprises:

at least one quaternary ammonium and/or phosphonium salt with general formula QA, where Q represents a quaternary ammonium and/or phosphonium cation of one of the following formulae:

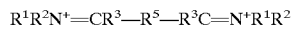
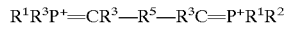

$R^1R^2N^+=CR^3-R^5-R^3C=N^+R^1R^2$ $R^1R^3P^+=CR^3-R^5-R^3C=P^+R^1R^2$ where $R^1$, $R^2$ and $R^3$ which may be identical or different, represent hydrogen or hydrocarbon residues containing 1 to 12 carbon atoms, and $R^5$ represents an alkylene or phenylene residue and A represents a tetrafluoroborate, tetrafluorochloroborate, hexafluorophosphate, hexafluoroantimonate, hexafluoroarsenate, dichlorocuprate, trifluoroarsenate, trifluoromethylsulphonate, fluorosulphonate, trichlorozincate, trichlorocuprate or tetrachlorocuprate anion; and at least one complex of at least one transition metal from groups 8, 9 or 10 in a concentration of 1–500 mmoles per liter of said at least one quaternary ammonium and/or phosphonium salt.

20. The catalytic composition of claim 19, wherein said transition metal complex has a concentration of 2–200 mmoles per liter of said at least one quaternary ammonium and/or phosphonium salt.

21. The catalytic composition of claim 19, wherein said transition metal complex has a concentration of 2–100 mmoles per liter of said at least one quaternary ammonium and/or phosphonium salt.

22. The catalytic composition of claim 19, wherein said transition metal complex has a concentration of 2–50 mmoles per liter of said at least one quaternary ammonium and/or phosphonium salt.

23. A non-aqueous catalytic composition comprising a non-aqueous solvent which is ionic in nature and liquid at a temperature below 150° C. wherein said solvent comprises:

at least one quaternary ammonium and/or phosphonium salt with formula QA, where Q represents a quaternary ammonium and/or phosphonium cation, and A represents an anion, said salt being selected from the group consisting of: N-butylpyridinium hexafluorophosphate, N-ethylpyridinium tetrafluoroborate, tetrabutylphosphonium tetrafluoroborate, 3-butyl-1-methylimidazolium hexafluoroantimonate, 3-butyl-1-methylimidazolium hexafluorophosphate, 3-butyl-1-methylimidazolium trifluoromethylsulphonate, pyridinium fluorosulphonate, trimethylphenylammonium hexafluorophosphate, 3-butyl-1-methylimidazolium tetrachloroaluminate, 3-butyl-1-methylimidazolium heptachloroaluminate, trimethylphenylammonium chloride, 3-ethyl-1-methylimidazolium chloride, N-ethylpyridinium bromide, 3-butyl-1-methylimidazolium chloride, diethylpyrazolium chloride, pyridinium hydrochloride, tetrabutylphosphonium bromide, and N-butylpyridinium chloride; and at least one complex of at least one transition metal from groups 8, 9 or 10.

* * * * *